UNITED STATES PATENT OFFICE.

IRA F. PECK, OF GREENWOOD, MISSISSIPPI.

INSECTICIDE AND PROCESS OF MAKING SAME.

1,185,603.   Specification of Letters Patent.   Patented May 30, 1916.

No Drawing.   Application filed March 9, 1916.   Serial No. 83,149.

*To all whom it may concern:*

Be it known that I, IRA F. PECK, a citizen of the United States, residing at Greenwood, in the county of Leflore and State of Mississippi, have invented new and useful Improvements in Insecticides and Processes of Making Same, of which the following is a specification.

The present invention relates to a composition of matter for use as an insecticide, and to a method of producing the same, and the invention has for its object the production of an insecticide which shall be more effective than the insecticide described in, and forming the subject matter of my prior Patent No. 1,119,036, dated December 1, 1914.

In the production of an insecticide, in accordance with the present invention, I preferably add to slaked lime, preferably while the same is in a heated condition and during the operation of slaking or hydrating, sufficient quantity of commercial arsenic and a suitable quantity of an alkali metal compound, capable of leaving free alkali in a soluble condition. The alkali may be used in the form of caustic or carbonate, and is preferably added in the form of a relatively concentrated solution.

I desire to state that it is not necessary that the alkali should be added in the form of caustic alkali, since any compound which will be converted into caustic alkali by the action of the lime is suitable for the purpose. If so desired I can use for example sodium carbonate, such as soda ash or soda crystals, or caustic soda, or potassium carbonate in the form of pearl ash, or caustic potash, or any other suitable alkali as above stated.

In order to more fully explain and to illustrate my invention, the following example is given: About 65 to 85 parts of quicklime are mixed with sufficient water to form a relatively stiff paste, and to this mixture is added, preferably while the mixture is still hot from the reaction of the water on the quicklime 3 to 20 parts of potassium or sodium carbonate, or caustic potash or caustic soda, preferably dissolved in a small quantity of water, although the dry substances may be used if desired. While this mixture is preferably still hot, I add thereto from 10 to 25 parts of arsenic preferably the commercial arsenious oxid. Such arsenic may be added dissolved with the potash or soda, or may be added separately either in solution or suspension, or as a solid. The arsenic may also be added in the form of a vapor or fume carried by a current of air or other suitable gas inert thereto, for example by bubbling said air or gas through the pasty liquid, in a suitable receptacle. The mixture thus produced, after cooling is a wet mass which must be preserved from drying and which can be added to any desired quantity of water and is preferably added to such amount of water as to produce a thin fluid mixture, capable of passing through a spray or atomizing device, and this fluid mixture is then sprayed upon the plants to be treated.

The presence of the alkali produces a substance which is more readily soluble in water than the product of my prior patent above noted, and is also more effective for the destruction of certain insects, particularly boll weevil. The insecticide produced in accordance with this invention is suitable for killing all insects which are harmful to plants and vegetation generally, and also appears to exercise a further beneficial action upon the plant or vegetation to which it is applied. Plants which have been treated with my composition prior to being set out are immune from the attacks of cut worms for a considerable time.

Without desiring to be bound to any particular theory of operation, it appears probable that in the preparation of my insecticide, the following reactions take place:

$$2Ca(OH)_2 + As_2O_3 = Ca_2As_2O_5 + 2H_2O$$

$$Ca(OH)_2 + 2MOH = CaM_2As_2O_5 + 2H_2O$$

$$2Ca(OH)_2 + 2MOH + As_2O_3 = 2CaMAsO_3 + 3H_2O$$

$$M_2CO_3 + Ca(OH)_2 = CaCO_3 + 2MOH$$

(M represents an alkali metal such as sodium, potassium, etc.)

It appears probable that the compounds of the general formula $CaMAsO_3$ are produced, which compounds are materially more soluble than any of the simple arsenites of calcium. An example of this would be the sodium-calcium ortho-arsenite $CaNaAsO_3$ or the potassium-calcium ortho-arsenite $CaKAsO_3$. The presence of these compounds in the product is extremely desirable.

In carrying out the process, I preferably leave a small quantity of free alkali metal hydroxid, or free lime, or both (stated generically as "free alkali") in the mixture, which exercises an extremely beneficial effect upon the plants and also exercises an extremely destructive effect upon all forms of insect life, as well as an extremely distinctive effect upon all sorts of fungous growth with which the vegetation may be infested.

What I claim is:—

1. An insecticide composition comprising a chemical compound of commercial arsenic, slaked lime and a substance containing an alkali metal, together with sufficient water to form a pasty mass, said composition containing some free alkali, and being capable of being mixed with a larger quantity of water to be held in suspension and solution therein, to provide an insecticidal spray.

2. An insecticide composition comprising a chemical compound of calcium, and alkali metal combined with the arsenious acid radical, said compound being mixed with sufficient water to form a pasty mass, and with some free alkali, said composition being capable of being mixed with a larger quantity of water to be held in solution and suspension therein to provide an insecticidal spray.

3. An insecticidal composition comprising as an ingredient thereof, $CaMAsO_3$, and containing some free alkali, said composition being distinguished from an insecticidal composition consisting essentially of $CaAs_2O_5$, in that said composition is more extensively soluble in water.

4. A method of producing an insecticide which comprises reacting upon a mixture including hydrated lime and an alkali metal compound with arsenic to produce a product containing a chemical compound of lime and alkali metal in combination with the arsenic radical and also a relatively small amount of free alkali, substantially as described.

Signed at Washington, D. C., this 9th day of March 1916.

IRA F. PECK.

Copies of this patent may be obtained for five cents each, by addressing the "Commissioner of Patents, Washington, D. C."